(No Model.)

E. C. RYER.
CALENDAR.

No. 442,337.          Patented Dec. 9, 1890.

*Fig. I.*

*Fig. II.*

Witnesses:
J. B. McGirr.
N. F. Bernhard

Inventor:
Edward C. Ryer
By his attorneys
Edson Bros.

UNITED STATES PATENT OFFICE.

EDWARD C. RYER, OF PHILADELPHIA, PENNSYLVANIA.

CALENDAR.

SPECIFICATION forming part of Letters Patent No. 442,337, dated December 9, 1890.

Application filed April 14, 1890. Serial No. 348,418. (No model.)

*To all whom it may concern:*

Be it known that I, EDWARD C. RYER, a citizen of the United States, residing at Philadelphia, in the county of Philadelphia and State of Pennsylvania, have invented certain new and useful Improvements in Calendars; and I do hereby declare the following to be a full, clear, and exact description of the invention, such as will enable others skilled in the art to which it appertains to make and use the same.

My invention relates to calendars; and the object of my invention is to promote convenience in finding the corresponding day of the week of the preceding and succeeding month or months or years.

With this end in view my invention consists of a calendar having the corresponding days of the current month arranged in series in vertical or horizontal columns, and each date having the corresponding date of one or more preceding and succeeding months or years arranged in close juxtaposition to such current date, as will be hereinafter more fully described and claimed.

In the accompanying drawings, Figure I is a diagrammatic view illustrating my improved calendar, showing the same adapted for one preceding month and one succeeding month of the year. Fig. II is a similar view of a part of a calendar constructed to indicate two preceding and succeeding months.

In the drawings, A designates a part of a calendar showing one of the months of a current year, and one of said calendars is provided for each month of the year, from January to December, inclusive. Each month may be printed or indelibly inscribed on separate sheets of paper, or the whole series on a common sheet of card-board, or the months may be printed or arranged in any other suitable manner.

The calendar for each month has its surface divided into blocks $b$ by horizontal and vertical lines $c\ d$, which form the vertical and horizontal columns across the face of the calendar, and at the head of the calendar a space $e$ is reserved for the name of month. The name of the current month is inscribed in prominent letters, while the names of the preceding and succeeding months are arranged in the space $e$ on the right and left, respectively, of the current month, the preceding month or months being arranged in advance of the current month, while the succeeding month or months are arranged in rear of the current month to enable a person to more readily distinguish the preceding and succeeding months, the names of which may be printed on the calendar in a different color from the current month and may not be so prominent as the current month; but this is optional. The vertical or horizontal columns correspond in number to the number of days of the week, and at the head or end of each column is the name or abbreviation of the name of the several days of the week, the names of the days of the week running from the left-hand edge toward the right-hand edge of the calendar A, or from top to bottom at one end of the calendar. Thus the first column contains the name of the first day, "Sunday," of the week, the second column the word "Monday," and so on throughout in the order in which the days are successively disposed. In the blocks $b$, formed by the horizontal and vertical lines $c\ d$, are the numerals designating the dates of the current month, and these numerals are placed in the columns under the names of the days in which the dates fall. Thus the dates of the Sundays of the month are in the first vertical or horizontal column, and so on throughout the series. The dates of the corresponding days of the week in the preceding and succeeding months are also arranged in the blocks $b$, containing the current dates, to enable one to readily ascertain such facts in making computations or acquiring information which may be useful in business transactions. Thus in the diagrammatic view, illustrated in the drawings as an embodiment of my invention, the fifth day of the month of April, 1890, falls on Saturday. The first day of the preceding month, March, falls on Saturday, and the third day of the succeeding month, May, likewise falls on Saturday.

The numerals designating the corresponding days of the preceding month or months are arranged in front or advance of the current dates in the upper and lower left-hand corners of the block $b$, while the dates of the succeeding month or months are indicated behind the current dates in the upper and lower right-hand corners of the block $b$, as indicated; but this is not essential. I prefer, however, to adopt this arrangement of the dates, and to print the dates of the preceding and succeeding months in smaller numerals and in different colors from the current dates to enable one to more readily distinguish the current dates from those of the preceding and succeeding months and enable this information to be easily acquired.

For large commercial calendars it may be advisable to adopt the arrangement shown in Fig. II, in which the dates of two or more preceding months are arranged in the upper and lower left-hand corners of each of the blocks $b$ containing the current dates, and those of two or more succeeding months in the upper and lower right-hand corners of the blocks $b$.

It will be seen that each page or section has a calendar for three or five or more months on its face, and that the dates of the current month are readily distinguishable from those of the preceding and succeeding months.

The relative arrangement of the calendar for the several months and the disposition of the blocks $b$, containing the dates and the matter thereon, can be varied within wide limits without departing from the spirit or sacrificing the advantages of my invention, the essential feature of which will be readily understood from the foregoing description, taken in connection with the drawings.

Having thus fully described my invention, what I claim as new, and desire to secure by Letters Patent, is—

1. A calendar having the dates of the current months arranged in columns with the names of the corresponding days of the week, and the corresponding dates of the preceding and succeeding months or years arranged in the columns containing the names of the days of the week and the current dates, as and for the purpose described.

2. A calendar having the series of columns, the dates of the current months in said columns under the respective days of the week, and the dates of the preceding and succeeding months or years arranged in the corresponding columns and within the blocks of the current dates, the dates of the preceding month or months being arranged in advance of the current dates and the dates of the succeeding month or months being in rear of the current dates, the current dates being prominent and distinguishable from the dates of the preceding and succeeding months, as and for the purpose described.

In testimony whereof I affix my signature in presence of two witnesses.

EDWARD C. RYER.

Witnesses:
　EDWARD S. DUNNING,
　THOS. H. CLARKE.